United States Patent
Niu et al.

(10) Patent No.: US 12,277,401 B2
(45) Date of Patent: Apr. 15, 2025

(54) METHOD AND APPARATUS FOR ACQUIRING PRE-TRAINED MODEL

(71) Applicant: BEIJING BAIDU NETCOM SCIENCE TECHNOLOGY CO., LTD., Beijing (CN)

(72) Inventors: Guocheng Niu, Beijing (CN); Wei Li, Beijing (CN); Can Gao, Beijing (CN); Xinyan Xiao, Beijing (CN); Hua Wu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 340 days.

(21) Appl. No.: 17/502,108

(22) Filed: Oct. 15, 2021

(65) Prior Publication Data

US 2022/0292269 A1 Sep. 15, 2022

(30) Foreign Application Priority Data

Mar. 15, 2021 (CN) .......................... 202110274515.0

(51) Int. Cl.
*G06F 18/25* (2023.01)
*G06F 40/205* (2020.01)
(Continued)

(52) U.S. Cl.
CPC ............ *G06F 40/58* (2020.01); *G06F 18/256* (2023.01); *G06F 40/205* (2020.01); *G06F 40/47* (2020.01); *G06N 3/02* (2013.01)

(58) Field of Classification Search
CPC .................................................. G06F 18/256
See application file for complete search history.

(56) References Cited

U.S. PATENT DOCUMENTS 11,423,072 B1 * 8/2022 Chen ...................... G06F 18/253
11,797,530 B1 * 10/2023 Bouyarmane .......... G06N 3/045
(Continued)

FOREIGN PATENT DOCUMENTS

CN 102521368 A 6/2012
CN 105740888 A 7/2016
(Continued)

OTHER PUBLICATIONS

Huo, Y., Zhang, M., Liu, G., Lu, H., Gao, Y., Yang, G., . . . & Wen, J. R. (2021). WenLan: Bridging vision and language by large-scale multi-modal pre-training. arXiv preprint arXiv:2103.06561.*
(Continued)

*Primary Examiner* — Bryan S Blankenagel
(74) *Attorney, Agent, or Firm* — Brooks Kushman P.C.

(57) ABSTRACT

The present disclosure discloses a method and apparatus for acquiring a pre-trained model, and relates to natural language processing and deep learning technologies in the field of artificial intelligence technologies. An implementation includes: acquiring training data, the training data including a single-modal language material and a multi-modal language material, and the multi-modal language material including a language material pair formed by a first-modal language material and a second-modal language material; and performing a multi-task training operation on a pre-trained model using the training data, the multi-task including at least one cross-modal contrastive learning task and at least one single-modal learning task; the pre-trained language model obtained in the present disclosure may learn from different forms of language materials, i.e., the single-modal language material and the multi-modal language material, such that the pre-trained language model may effectively process information in various modals.

7 Claims, 4 Drawing Sheets

(51) Int. Cl.
  *G06F 40/47* (2020.01)
  *G06F 40/58* (2020.01)
  *G06N 3/02* (2006.01)

(56) References Cited

U.S. PATENT DOCUMENTS

| | | | | |
|---|---|---|---|---|
| 2019/0035431 A1* | 1/2019 | Attorre | ............... | G10L 25/30 |
| 2019/0266262 A1* | 8/2019 | He | ............... | G06N 3/045 |
| 2019/0370616 A1 | 12/2019 | Eser et al. | | |
| 2020/0349529 A1* | 11/2020 | Wang | ............... | G06F 40/284 |
| 2020/0380298 A1* | 12/2020 | Aggarwal | ............... | G06V 30/19147 |
| 2021/0073479 A1* | 3/2021 | Yamada | ............... | H04N 21/4882 |
| 2022/0147838 A1* | 5/2022 | Gu | ............... | G06V 20/00 |
| 2022/0198276 A1* | 6/2022 | Wang | ............... | G06F 40/30 |
| 2022/0284321 A1* | 9/2022 | Yuan | ............... | G06N 20/00 |
| 2024/0054767 A1* | 2/2024 | Li | ............... | G06F 40/51 |
| 2024/0185602 A1* | 6/2024 | Liu | ............... | G06F 40/40 |

FOREIGN PATENT DOCUMENTS

| | | |
|---|---|---|
| CN | 107562812 A | 1/2018 |
| CN | 108664999 A | 10/2018 |
| CN | 111461203 A | 7/2020 |
| CN | 111507111 A | 8/2020 |
| CN | 111680145 A | 9/2020 |
| CN | 112100332 A | 12/2020 |
| CN | 112257445 A | 1/2021 |
| CN | 112257465 A | 1/2021 |
| JP | 2020149685 A | 9/2020 |

OTHER PUBLICATIONS

Qi, D., Su, L., Song, J., Cui, E., Bharti, T., & Sacheti, A. (2020). Imagebert: Cross-modal pre-training with large-scale weak-supervised image-text data. arXiv preprint arXiv:2001.07966.*
Extended European Search Report of European application No. 21197865.5 dated Mar. 16, 2022, 11 pages.
Wei et al., "UNIMO: Towards Unified-Modal Understanding and Generation via Cross-Modal Contrastive Learning", arxiv.org, Cornell University Library, Dec. 31, 2020, XP081849329, 11 pages.
Komarovsky, "Deep Multi-Task Learning—3 Lessons Learned", Jun. 6, 2019, pp. 1-7, XP055897896, Taboola Blog retrieved from the Internet: URL: <https://blog.taboola.com/deep-multi-task-learning-3-lessons-learned/>, retrieved on Mar. 4, 2022, 7 pages.
Search Report of Chinese Application No. 2021102745150 dated Apr. 19, 2021, 3 pages.
Search Report of Chinese Application No. 2021102745150 dated May 11, 2021, 2 pages.
Search Report of Chinese Application No. 2021102745150 dated Aug. 25, 2021, 2 pages.
Li et al., "UNIMO: Towards Unified-Modal Understanding and Generation via Cross-Modal Contrative Learning", https://mi.mbd.baidu.com/r/mm08EpUMPm?f=cp&u=b7d196cbe6f85c6d, Dec. 31, 2020, 10 pages.

* cited by examiner

METHOD AND APPARATUS FOR ACQUIRING PRE-TRAINED MODEL

CROSS-REFERENCE TO RELATED APPLICATIONS

The present application claims the priority of Chinese Patent Application No. 202110274515.0, filed on Mar. 15, 2021, with the title of "Method and apparatus for acquiring pre-trained model." The disclosure of the above application is incorporated herein by reference in its entirety.

TECHNICAL FIELD

The present disclosure relates to the field of computer application technologies, and particularly to natural language processing and deep learning technologies in the field of artificial intelligence technologies.

BACKGROUND

A large-scale pre-trained model gains wide attention due to its powerful generalization capability and efficient utilization of scale data. Obviously, most of existing pre-training methods are only used for single-modal scenarios, for example, only for images or texts.

However, a human perceives the world in a variety of ways, such as vision, a language, a sound, or the like. A combination of information in plural modals may achieve a better information understanding effect, and therefore, an excellent artificial intelligence system should be able to effectively process information in various modals.

SUMMARY

The present disclosure provides a method and apparatus for acquiring a cross-modal pre-trained model, a device, a computer storage medium and a program product.

According to a first aspect of the present disclosure, there is provided a method for acquiring a pre-trained model, including acquiring training data, the training data including a single-modal language material and a multi-modal language material, and the multi-modal language material including a language material pair formed by a first-modal language material and a second-modal language material; and performing a multi-task training operation on a pre-trained model using the training data, the multi-task including at least one cross-modal contrastive learning task and at least one single-modal learning task; wherein the cross-modal contrastive learning task includes: determining similarity between the first-modal language material and the second-modal language material in the multi-modal language material utilizing a vector representation of the first-modal language material and a vector representation of the second-modal language material in the multi-modal language material by the pre-trained model, with a training target of maximizing the similarity between the first-modal language material and the second-modal language material in a positive multi-modal language material and minimizing the similarity between the first-modal language material and the second-modal language material in a negative multi-modal language material; and the single-modal learning task includes: predicting a second part of content in the single-modal language material utilizing a vector representation of a first part of content in the single-modal language material by the pre-trained model, with a training target of minimizing a difference between the predicted second part of content and the second part of content in the single-modal language material.

According to a second aspect of the present disclosure, there is provided an electronic device, including at least one processor; and a memory communicatively connected with the at least one processor; wherein the memory stores instructions executable by the at least one processor, and the instructions are executed by the at least one processor to enable the at least one processor to perform a method for acquiring a pre-trained model, wherein the method includes acquiring training data, the training data including a single-modal language material and a multi-modal language material, and the multi-modal language material including a language material pair formed by a first-modal language material and a second-modal language material; and performing a multi-task training operation on a pre-trained model using the training data, the multi-task including at least one cross-modal contrastive learning task and at least one single-modal learning task; wherein the cross-modal contrastive learning task includes: determining similarity between the first-modal language material and the second-modal language material in the multi-modal language material utilizing a vector representation of the first-modal language material and a vector representation of the second-modal language material in the multi-modal language material by the pre-trained model, with a training target of maximizing the similarity between the first-modal language material and the second-modal language material in a positive multi-modal language material and minimizing the similarity between the first-modal language material and the second-modal language material in a negative multi-modal language material; and the single-modal learning task includes: predicting a second part of content in the single-modal language material utilizing a vector representation of a first part of content in the single-modal language material by the pre-trained model, with a training target of minimizing a difference between the predicted second part of content and the second part of content in the single-modal language material.

In a third aspect, the present disclosure provides a non-transitory computer readable storage medium with computer instructions stored thereon, wherein the computer instructions are used for causing a computer to perform a method for acquiring a pre-trained model, wherein the method includes acquiring training data, the training data comprising a single-modal language material and a multi-modal language material, and the multi-modal language material comprising a language material pair formed by a first-modal language material and a second-modal language material; and performing a multi-task training operation on a pre-trained model using the training data, the multi-task comprising at least one cross-modal contrastive learning task and at least one single-modal learning task; wherein the cross-modal contrastive learning task includes: determining similarity between the first-modal language material and the second-modal language material in the multi-modal language material utilizing a vector representation of the first-modal language material and a vector representation of the second-modal language material in the multi-modal language material by the pre-trained model, with a training target of maximizing the similarity between the first-modal language material and the second-modal language material in a positive multi-modal language material and minimizing the similarity between the first-modal language material and the second-modal language material in a negative multi-modal language material; and the single-modal learning task includes: predicting a second part of content in the single-modal language material utilizing a vector representation of a first part of content in the single-modal language material by the pre-trained model, with a training target of minimizing a difference between the predicted second part of content and the second part of content in the single-modal language material.

According to the above technical solution, the pre-trained language model obtained in the present disclosure may learn from different forms of language materials, i.e., the single-modal language material and the multi-modal language material, such that the pre-trained language model may effectively process information in various modals. In addition, in the learning process, the language materials in different modals are enhanced by each other, such that the obtained pre-trained language model has a better semantic comprehension capability and a better generalizable representation.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. wherein.

DETAILED DESCRIPTION

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

Most of existing pre-trained models may only process single-modal data; for example, a bidirectional encoder representation from transformers (BERT) model may only learn and process text data. A simple framework for contrastive learning of visual representations (SimCLR) model is only able to learn and process image data. A vision-and-language BERT (ViLBERT) model is able to learn and process an image-text pair (i.e., a language material pair formed by an image and a text), but has a poor processing capability for pure image or text data. The present disclosure provides a method for acquiring a pre-trained model capable of implementing a cross-modal data learning operation, which makes full use of information in plural modals, such that the pre-trained model may map data in various modals to a same semantic representation space. The method according to the present disclosure will be described below in detail in conjunction with an embodiment.

Figure 1:
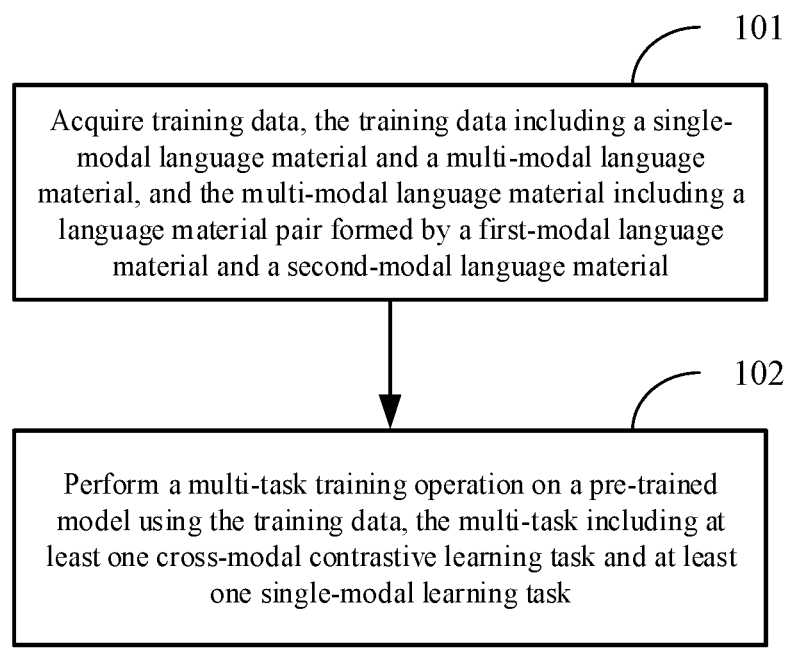
FIG. 1 is a flow chart of a main method according to an embodiment of the present disclosure.

FIG. 1 is a flow chart of a main method according to an embodiment of the present disclosure, and a subject for executing the method may be an apparatus on a server side or an apparatus in a computer terminal. The apparatus may be embodied as an application or as a functional unit, such as a plug-in or software development kit (SDK) in an application, or the like, which is not particularly limited in the embodiment of the present disclosure. As shown in FIG. 1, the method may include the following steps:

101: acquiring training data, the training data including a single-modal language material and a multi-modal language material, and the multi-modal language material including a language material pair formed by a first-modal language material and a second-modal language material.

The single-modal language material in the present disclosure refers to a language material in a single modal, such as a language material in a modal like an image, a text, a video, or an audio, or the like. One or more single-modal language materials may be included in the present disclosure.

The multi-modal language material refers to a language material pair formed by language materials in two modals, such as a language material pair formed by an image and a text, a language material pair formed by an image and an audio, a language material pair formed by a text and a video, or the like.

As a preferred embodiment, the multi-modal language material may include a positive multi-modal language material and a negative multi-modal language material, the first-modal language material and the second-modal language material included in the positive multi-modal language material express the same semantics, and the first-modal language material and the second-modal language material included in the negative multi-modal language material express different semantics.

102: performing a multi-task training operation on a pre-trained model using the training data, the multi-task including at least one cross-modal contrastive learning task and at least one single-modal learning task.

The cross-modal contrastive learning task includes: determining similarity between the first-modal language material and the second-modal language material in the multi-modal language material utilizing a vector representation of the first-modal language material and a vector representation of the second-modal language material in the multi-modal language material by the pre-trained model, with a training target of maximizing the similarity between the first-modal language material and the second-modal language material in a positive multi-modal language material and minimizing the similarity between the first-modal language material and the second-modal language material in a negative multi-modal language material.

The single-modal learning task includes: predicting a second part of content in the single-modal language material utilizing a vector representation of a first part of content in the single-modal language material by the pre-trained model, with a training target of minimizing a difference between the predicted second part of content and the second part of content in the single-modal language material.

Figure 2:
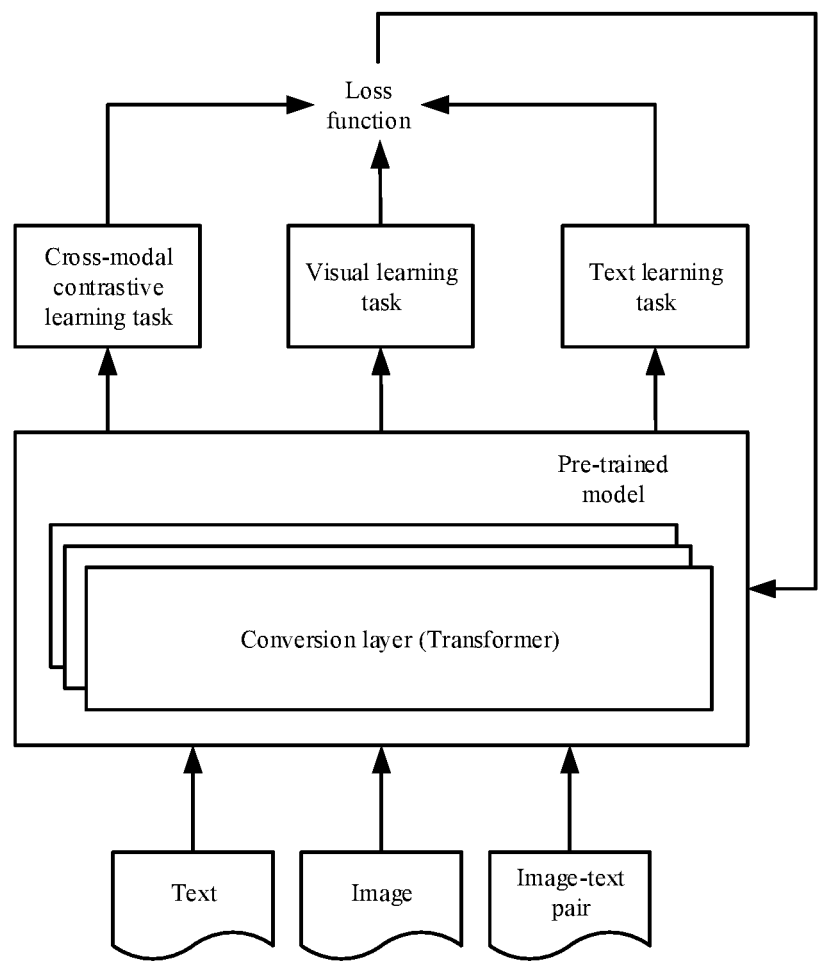
FIG. 2 is a schematic diagram of training a pre-trained language model according to an embodiment of the present disclosure.

In the present disclosure, a multi-layer Transformer may be used as a main model of the pre-trained language model; as shown in FIG. 2, the training data is used as input of the pre-trained language model, and the pre-trained language model maps the language material in the training data to a uniform vector space, that is, outputs a vector representation of each language material (including each language material of the single-modal language material and each first-modal language material and each second-modal language material of the multi-modal language material).

More specifically, each token (semantic element) included in one language material is input into the pre-trained language model, and a vector representation of each token is output by the pre-trained language model. For a text language material, each token may be each character contained in a text, or each word, or the like. For an image language material, each token may be each target region or each pixel included in an image, or the like. A video language material may be decomposed into image frames, and each token may be each image frame, or a key image frame, or the like. For an audio language material, each token may be each audio frame, each audio segment, or each frame spectrogram obtained according to a frequency, an intensity, or the like, of an audio.

In the training process of the pre-trained language model, the multi-task training operation is used. In the cross-modal contrastive learning task, the training operation is mainly performed utilizing the multi-modal language material, and in the single-modal learning task, the training operation is performed utilizing the single-modal language material. The multi-task may be used for a joint or alternate or sequential training operation.

For better understanding of the present disclosure, each step in the above-mentioned method is described below in detail with an image and a text as the single-modal language material and an image-text pair as the multi-modal language material, for example.

First, the above step 101 of acquiring training data is described in detail in conjunction with the embodiment.

There exists a large amount of data in different modals in a network, mainly including text information and visual information, and usually, text knowledge and visual knowledge complement each other. The part of the human brain responsible for vision may also learn and process information in other modals, including touch and sounds. Unification of data in different modals has the biggest challenge of unifying the data into the same semantic spaces which may be generalized to different data patterns. Therefore, the training data acquired in this step includes data in plural modals, which is represented as the multi-modal language material and the single-modal language material.

The multi-modal language material is derived from data which appears semantically in pairs on the network. An image-text pair is taken as an example. Image-text pairs may be crawled from the network in advance to form an image-text pair database, and the multi-modal language material may be directly obtained from the image-text pair database in this step. How to crawl the image-text pair from the network may be implemented using existing technologies. For example, an image may be crawled from the network, and then, a description text of the image is extracted from a context of the image, and then, an image-text pair is formed by the image and the description text. For another example, an image may be crawled from the network, and then, a description text is manually labeled, and an image-text pair is formed by the image and the description text.

In addition to the multi-modal language material in the pair form, there exists a larger-scale single-modal language material in a non-pair form on the network, such as a pure text language material, a pure image language material, or the like. After crawled from the network, these single-modal language materials may be screened to form a single-modal corpus, such as a text database, an image database, or the like. In this step, the single-modal language material may be directly obtained from the single-modal corpus; for example, a text language material and an image language material are acquired.

Furthermore, extension may be performed on the positive and negative multi-modal language materials in the training data obtained from a multi-modal language material database, and the adopted extension method may include at least one of rewriting extension and retrieval extension; and then, the obtained multi-modal language material is added into the training data. In a subsequent cross-modal contrastive learning process, qualities of the positive multi-modal language material and the negative multi-modal language material have an important influence on a final effect of the pre-trained model, and therefore, in order to obtain the high-quality positive multi-modal language material and the high-quality negative multi-modal language material and fuse more single-modal language materials to assist in the learning process, at least one of the following extension methods may be adopted.

The First Extension Method: Rewriting Extension

Extension of the positive multi-modal language material may include: if the first-modal language material in the positive multi-modal language material is a text in a first language, translating the text in the first language into a text in a second language and then translating the text in the second language back to a text in the first language using a translation model, and constructing a new positive multi-modal language material by the text in the first language obtained after translation and the second-modal language material in the positive multi-modal language material.

The above extension of the positive multi-modal language material is mainly based on a back translation. For example, a positive multi-modal language material is an image-text pair formed by image1 and text1. Assuming that text1 is a Chinese text, the Chinese text may be translated into an English text, a French text, or the like, using a machine translation model, and then, the obtained English text, the obtained French text, or the like, are translated back into Chinese texts, so as to obtain text2, text3, or the like. Then, the image-text pair formed by image1 and text2 and the image-text pair formed by image1 and text3 may be added to the training data as new positive multi-modal language materials, thereby extending the positive multi-modal language material. Usually, this extension is text rewriting extension based on a sentence level.

Extension of the negative multi-modal language material may include: parsing the first-modal language material in the positive multi-modal language material into a scenario graph, randomly replacing at least one of an entity, an attribute and a relationship in the scenario graph, converting the scenario graph obtained after replacement back into the first-modal language material, and constructing a new negative multi-modal language material by the first-modal language material obtained after conversion and the second-modal language material in the positive multi-modal language material.

Figure 3:
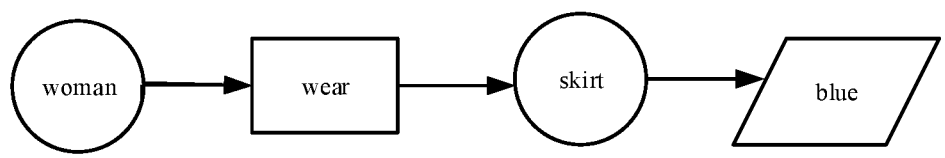
FIG. 3 is a schematic diagram of a scenario according to an embodiment of the present disclosure.

The scenario graph is a data structure which includes three nodes: an entity node, an attribute node, and a relationship node. The entity node corresponds to an entity word, the attribute node corresponds to an attribute word, and the relationship node corresponds to a relationship word. For example, the positive image-text pair is formed by image1 and text1, and text1 is "a woman wears a blue skirt". "Woman" and "skirt" are entity nodes. "Blue" is an attribute node and reflects an attribute of the entity node "skirt", and "wear" is a relationship node and reflects a relationship between the entity nodes "woman" and "skirt". The generated scenario graph may be shown in FIG. 3 in which the circular node represents the entity node, the square node represents the relationship node, and the parallelogram node represents the attribute node.

At least one of the entity node, the attribute node and the relationship node in the scenario graph is replaced to form, for example, text2 "a woman wears a red skirt", text3 "a woman wears blue trousers", text4 "a woman wears red trousers", or the like. Then, image1 and text2 form a new image-text pair, image1 and text3 form a new image-text pair, image1 and text4 form a new image-text pair, and the new image-text pairs are added into the training data as negative multi-modal language materials, thereby extending the negative multi-modal language material. This extension is rewriting extension mainly based on a phrase level and a vocabulary level.

The Second Extension Method: Retrieval Extension

The first-modal language material of the positive multi-modal language material is retrieved in a first-modal corpus, and a new positive multi-modal language material is constructed using the retrieved language material and the second-modal language material in the positive multi-modal language material.

The positive image-text pair formed by an image 1 and a text 1 is taken as an example.

As one implementation, retrieval may be performed in the text database using text1 to obtain texts with similarity to the text 1 greater than or equal to a preset similarity threshold, and the retrieved texts are combined with the image 1 respectively to obtain new positive image-text pairs. The retrieved text may be regarded as background knowledge at a text level of the positive image-text pair formed by image1 and text1, and the background knowledge is used as a supplement of a training sample.

The similarity between the texts may be determined in various ways in the retrieval process. For example, a vector representation of each text is determined based on a high semantic representation capability of BERT, and similarity between the vector representations is calculated as the similarity between the texts. For another example, based on a TF-IDF statistical means, keywords (i.e., words with TF-IDF greater than or equal to a preset statistical threshold) in each text may be determined to obtain a word set of each text; a word frequency vector corresponding to each text is obtained based on a word frequency of each word in the word set in each text; and similarity between the word frequency vectors is calculated as the similarity between corresponding texts.

As another implementation, a search may be performed in an image text library using the image 1 to obtain images with similarity to the image 1 greater than or equal to a preset similarity threshold, and the retrieved images are combined with the text 1 respectively to obtain new positive image-text pairs. The retrieved image may be regarded as background knowledge at an image level of the positive image-text pair formed by the image 1 and the text 1, and the background knowledge is used as a supplement of a training sample.

The similarity between the images may be determined in various ways in the retrieval process. One way is provided here: each image may be detected using a target detection tool, so as to determine an overlapping rate of an object contained in each detected image as a representation of the similarity between the corresponding images. For example, if the image 1 contains objects "woman", "flower", "green grass" and "sun", an image 2 contains "woman", "flower", "rainbow" and "schoolbag", and an image 3 contains "woman", "flower" and "green grass", the overlapping rate of the objects between the image 1 and the image 3 is higher than the overlapping rate of the objects between the image 1 and the image 2; that is, the image 3 is more similar to the image 1 than the image 2.

The above-mentioned step 102 of performing a multi-task training operation on a pre-trained model using the training data, the multi-task including at least one cross-modal contrastive learning task and at least one single-modal learning task is described in detail in conjunction with the embodiment.

It is assumed that the training data includes an image, a text, and an image-text pair.

The text represented as W is divided into tokens to form a sequence as input to the pre-trained language model, and the sequence is represented as $\{[CLS], w_1, w_2, \ldots, w_n, [SEP]\}$. The special symbols [CLS] and [SEP] represent a starting position and an ending position of the sequence respectively, and n is a positive integer. A semantic representation corresponding to each token is obtained after a multi-layer attention mechanism of the pre-trained language model, and the semantic representations are embodied as a vector representation sequence $h_{[CLS]}, h_{w_1}, h_{w_2}, \ldots, h_{w_n}, h_{[SEP]}$.

An object region included in the image represented as V may be detected by the target detection tool, and a feature of each object region is used as each token, the token and a feature of the whole image form a sequence as the input of the pre-trained language model, and the sequence is represented as $\{[Image], v_1, v_2, \ldots, v_t\}$, t being a positive integer. [Image] represents the feature of the entire image. The above-mentioned feature may be a feature obtained by linear transformation or neural network transformation of the corresponding image or region. A semantic representation corresponding to each token is obtained after the multi-layer attention mechanism of the pre-trained language model, and the semantic representations are embodied as a vector representation sequence $h_{[image]}, h_{v_1}, h_{v_2}, \ldots, h_{v_t}$.

For the image-text pair represented as (V, W), tokens of V and W are stitched to form a sequence as the input of the pre-trained language model, and the input is represented as:

$$\{[Image], v_1, v_2, \ldots, v_t, [CLS], w_1, w_2, \ldots, w_n, [SEP]\}.$$

A semantic representation corresponding to each token is obtained after the multi-layer attention mechanism of the pre-trained language model, and the semantic representations are embodied as a vector representation sequence:

$$\{h_{[image]}, h_{v_1}, h_{v_2}, \ldots, h_{v_t}, h_{[CLS]}, h_{w_1}, h_{w_2}, \ldots, h_{w_n}, h_{[SEP]}\}.$$

For the image-text pair denoted as (V, W), sequences of V and W may also serve as the input, and a vector representation of V and a vector representation of W may be obtained by the pre-trained language model.

The cross-modal contrastive learning task has a main idea of making the image-text pair with the same meaning, i.e., the positive image-text pair, closer in the semantic space, and the image-text pair with different meanings, i.e., the negative image-text pair, farther in the semantic space. That is, the training target is to maximize the similarity between the image and the text in the positive image-text pair and minimize the similarity between the image and the text in the negative image-text pair.

As a preferred embodiment, the image-text pairs obtained by means of the rewriting extension and the retrieval extension may be distinguished in the way of calculating the similarity.

The similarity between the image and the text in the image-text pair obtained by the rewriting extension is determined by: stitching the image and the text, and mapping a vector representation of the stitched language material obtained by the pre-trained model into a similarity value. This way of calculating the similarity is referred to as a "single-flow" way. In this way, the sequence of the image and the sequence of the text are stitched and then input into the pre-trained model. The pre-trained model obtains an overall vector representation for the stitched sequence, and the similarity value is obtained after the vector representation is mapped (for example, Softmax).

The similarity between the image and the text in the image-text pair obtained by the retrieval extension is determined by: calculating similarity between a vector representation of the image obtained by the pre-trained model and a vector representation of the text obtained by the pre-trained model, for example, calculating cosine similarity between the two vector representations. This way of calculating the similarity is referred to as a "double-tower" way. In this way, the sequence of the image (the sequence formed by the tokens included in the image) and the sequence of the text (the sequence formed by the tokens included in the text) in the image-text pair are input into the pre-trained model, and the pre-trained model obtains the vector representation of the image and the vector representation of the text.

The reason why the image-text pairs obtained by means of the rewriting extension and the retrieval extension are distinguished in the way of calculating the similarity is that in the "single-flow" similarity calculation way, a strong correlation mapping operation is performed after the image and the text are stitched, and this way is more suitable for "distinction", that is, for distinguishing the image-text pair obtained by means of the rewriting extension from an original positive image-text pair. The image or text obtained by the retrieval extension is a positive image-text pair existing as "background knowledge" of the original image-text pair. In the "double-tower" similarity calculation way, a weak correlation calculation is performed through a distance after the image and the text are encoded respectively, and this way is suitable for better understanding content of the image or the text, and therefore, the retrieval extension is more suitable for the "double-tower" similarity calculation way, and enables the pre-trained model to better understand the content of the image or the text.

Any of the above-mentioned similarity calculation ways may be adopted for the original image-text pair in the training data.

As shown in FIG. 2, in the cross-modal contrastive learning task, a loss function may be constructed according to the above-mentioned two similarity determination ways. For example, the following loss function $Loss_{cmcl}$ may be adopted:

$$Loss_{cmcl} = E_{V,W \in D}[-\log \frac{\sum_{(V^+,W^+) \in A^-} \exp(d(V^+, W^+)) + \sum_{(V^+,W^+) \in B^+} \exp(d(V^+, W^+))}{\sum_{(V^+,W^+) \in [A^+,A^-]} \exp(d(V', W')) + \sum_{(V^+,W^+) \in [B^+,B^-]} \exp(d(V', W'))}$$

wherein E is an operating function for taking an expected value, $A^+$ and $A^-$ represent the positive image-text pair and the negative image-text pair obtained by the rewriting extension, and $B^+$ and $B^-$ represent the positive image-text pair and the negative image-text pair obtained by the retrieval extension. d( ) represents a similarity function. D represents a training data set, and specifically a data set of image-text pair language materials in this loss function. $V^+$ and $W^+$ represent the text and the image in the positive image-text pair respectively. V' and W' represent the text and the image which may be taken from both the positive and negative image-text pairs.

As shown in FIG. 2, the single-modal learning task includes a visual learning task and a text learning task.

The visual learning task is a learning task for an image. In the visual learning task, a method similar to a masked language model is adopted. A region is randomly selected from the image to be masked, and the masked region is reconstructed using a vector representation of an unmasked region by pre-trained model, with a training target of minimizing a difference between the reconstructed region and the masked region in the image.

For example, a loss function $Loss_V$ for the visual learning task may be constructed:

$$Loss_V = E_{V \in D} f_\theta(v_m | v_{\setminus m})$$

wherein $v_m$ is the masked region in the image V, $v_{\setminus m}$ is the unmasked region in the image V, $f_\theta( )$ is a KL distance (relative entropy) function, and D represents a training data set, and may specifically refer to a data set of image language materials in this loss function, or further include the image in a data set of image-text pair language materials.

Similarly, a region of an image in an image-text pair may be masked, and the masked region in the image is reconstructed using a vector representation of a text and a vector representation of an unmasked region in the image by the pre-trained model, with a training target of minimizing a difference between the reconstructed region and the unmasked region in the image.

At this point, the constructed loss function for the visual learning task may be:

$$Loss_V = E_{V \in D} f_\theta(v_m | v_{\setminus m}, W)$$

wherein the image W and the text V form the image-text pair, and D represents a training data set, and specifically a data set of image-text pair language materials in this loss function.

The text learning task is a learning task for a text. In the text learning task, a method similar to the masked language model may also be adopted. A part of tokens are randomly selected from a text of a single-modal language material to be masked, and the masked token is restored using a vector representation of an unmasked token by the pre-trained model. A training target lies in minimizing a difference between the restored token and the masked token in the text.

The above-mentioned restoration may be implemented using a prediction model or a generation model. During implementation using a prediction model, the prediction model may be configured as a bidirectional prediction model, and the adopted loss function $Loss_{Bidir}$ may be:

$$Loss_{Bidir}=E_{W\in D}\log P_\theta(w_m|w_{\setminus m})$$

wherein $w_m$ is the masked token in the text W, $w_m$ is the unmasked token in the text W, $P_\theta(\ )$ is a likelihood function, and D represents a training data set, and may specifically refer to a data set of text language materials in this loss function, or further include the text in a data set of image-text pair language materials.

During implementation using a generation model, the generation model may be configured as a sequence generation model. When the sequence generation model is adopted, a part of continuous tokens are required to be randomly selected from the text W, and denoted as T, $T=\{w_i, \ldots, w_j\}$, and the rest tokens are denoted as S. In this case, the adopted loss function $Loss_{Seq2seq}$ may be:

$$Loss_{Seq2seq}=E_{(S,T)\in D}\log(\Pi_{i=1}^{|T|}P_\theta(T_j|T_{<j}, S))$$

wherein D represents a training data set, and specifically refers to a data set of text language materials in this loss function, or further include the text in a data set of image-text pair language materials.

Similarly, in the text learning task, the learning process may also be performed for the text W in the image-text pair (V, W), a part of tokens in the text are randomly selected to be masked, and the masked token is restored using a vector representation of an unmasked token and a vector representation of the image W in the image-text pair by the pre-trained model. A training target lies in minimizing a difference between the restored token and the masked token in the text.

Similarly, the above-mentioned restoration may be implemented using a prediction model or a generation model. During implementation using a prediction model, the prediction model may be configured as a bidirectional prediction model, and the adopted loss function $Loss_{Bidir}$ may be:

$$Loss_{Bidir}=E_{W\in D}\log P_\theta(w_m|w_{\setminus m}, W)$$

wherein D represents a training data set, and specifically a data set of image-text pair language materials in this loss function.

During implementation using a generation model, the generation model may be configured as a sequence generation model. The adopted loss function $Loss_{Seq2seq}$ may be:

$$Loss_{Seq2seq}=E_{(S,T)\in D}\log(\Pi_{i=1}^{|T|}P_\theta(T_j|T_{<j}, S, V))$$

wherein D represents a training data set, and specifically a data set of image-text pair language materials in this loss function.

In the multi-task training operation, as shown in FIG. 2, a joint training way may be adopted. As a preferred embodiment, a total loss function may be constructed using the loss function of each task, and parameters of the pre-trained model may be updated using the constructed total loss function. For example, the total loss function Loss may be constructed as:

$$Loss=Loss_{cmcl}+Loss_{V}+Loss_{Bidir}+Loss_{Seq2seq}$$

In addition to the above-mentioned joint training way, an alternate training way may be adopted. For example, the training tasks are alternately performed in sequence for training, and a respective loss function is adopted for each training task during the training operation.

In addition to the joint training way and the alternate training way, a sequential training way may be used. For example, first, the training operation is performed using the cross-modal contrastive learning task. After the training operation is finished, the visual learning task is performed on the basis of the pre-trained model obtained by the training operation. After the training operation is finished, the text learning task is performed on the basis of the pre-trained model obtained by the training operation, so as to finally obtain the pre-trained model. A respective loss function is adopted for each training task in the training process.

After the training process of the pre-trained model is completed, a downstream task may be hooked, and the pre-trained model is finely adjusted according to training data corresponding to the downstream task. The downstream task may be, for example, a single-modal data classification task, a multi-modal understanding and generation task, a single-modal data understanding and generation task, or the like. For example, the downstream task may be a text classification task, an image classification task, a task of generating questions and answers for images, a task of generating images for texts, or the like.

From the foregoing description, the above-mentioned method embodiment may have the following advantages.

1) The pre-trained language model obtained in the embodiment of the present disclosure may learn from different forms of language materials, i.e., the single-modal language material and the multi-modal language material, such that the pre-trained language model may effectively process information in various modals.

2) In the learning process, the language materials in different modals are enhanced by each other, such that the obtained pre-trained language model has a better semantic comprehension capability and a better generalizable representation, which has a great innovative significance for innovation of a technical idea of artificial intelligence.

3) A large number of unpaired text corpora and image sets on a network may be fully utilized, and more generalizable texts and visual representations may be learned, thus improving visual and language understanding and generating capabilities.

The method according to the present disclosure is described above in detail, and an apparatus according to the present disclosure will be described below in detail in conjunction with an embodiment.

Figure 4:
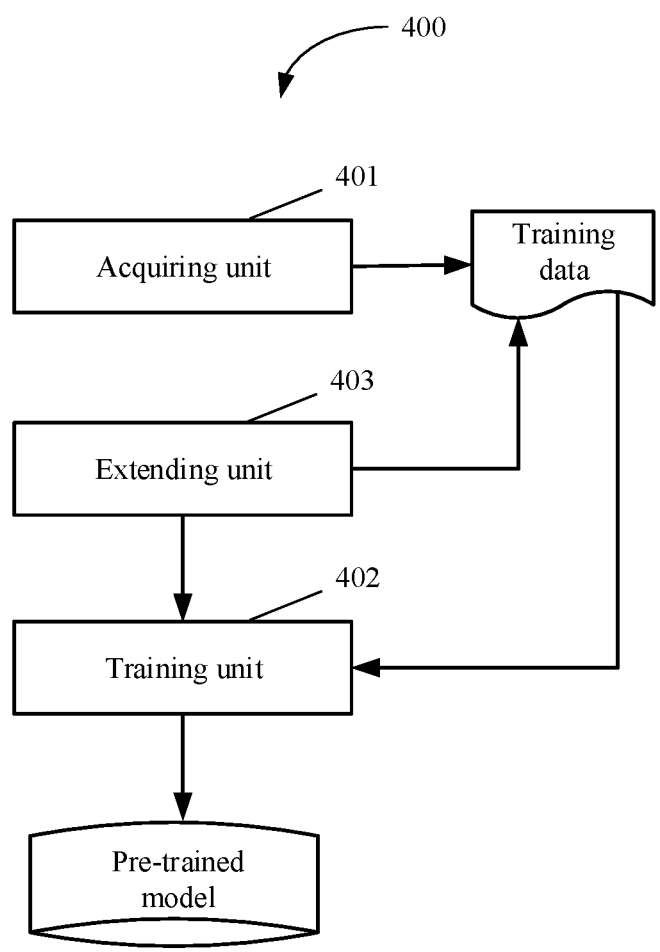
FIG. 4 is a schematic structural diagram of an apparatus for acquiring a pre-trained model according to an embodiment of the present disclosure.

FIG. 4 is a schematic structural diagram of an apparatus for acquiring a pre-trained model according to an embodiment of the present disclosure, and as shown in FIG. 4, the apparatus 400 includes an acquiring unit 401 and a training unit 402, and may further include an extending unit 403. The main functions of each constitutional unit are as follows.

The acquiring unit 401 is configured to acquire training data, the training data including a single-modal language material and a multi-modal language material, and the multi-modal language material including a language material pair formed by a first-modal language material and a second-modal language material.

The training unit 402 is configured to perform a multi-task training operation on a pre-trained model using the training data, the multi-task including at least one cross-modal contrastive learning task and at least one single-modal learning task.

The cross-modal contrastive learning task includes: determining similarity between the first-modal language material and the second-modal language material in the multi-modal language material utilizing a vector representation of the first-modal language material and a vector representation of the second-modal language material in the multi-modal language material by the pre-trained model, with a training target of maximizing the similarity between the first-modal language material and the second-modal language material in a positive multi-modal language material and minimizing the similarity between the first-modal language material and the second-modal language material in a negative multi-modal language material.

The single-modal learning task includes: predicting a second part of content in the single-modal language material utilizing a vector representation of a first part of content in the single-modal language material by the pre-trained model, with a training target of minimizing a difference between the predicted second part of content and the second part of content in the single-modal language material.

The extending unit 403 is configured to perform at least one of rewriting extension and retrieval extension on the multi-modal language material in the training data, and add the extended multi-modal language material into the training data.

The above-mentioned retrieval extension includes: retrieving the first-modal language material of the positive multi-modal language material in a first-modal corpus, and constructing a new positive multi-modal language material using the retrieved language material and the second-modal language material in the positive multi-modal language material.

The above-mentioned rewriting extension includes: if the first-modal language material in the positive multi-modal language material is a text in a first language, translating the text in the first language into a text in a second language and then translating the text in the second language back to a text in the first language using a translation model, and constructing a new positive multi-modal language material by the text in the first language obtained after translation and the second-modal language material in the positive multi-modal language material; or parsing the first-modal language material in the positive multi-modal language material into a scenario graph, randomly replacing at least one of an entity, an attribute and a relationship in the scenario graph, converting the scenario graph obtained after replacement back into the first-modal language material, and constructing a new negative multi-modal language material by the first-modal language material obtained after conversion and the second-modal language material in the positive multi-modal language material.

As an realizable way, when performing the cross-modal contrastive learning task, the training unit 402 may determine the similarity between the first-modal language material and the second-modal language material in the multi-modal language material obtained by the retrieval extension by: calculating similarity between a vector representation of the first-modal language material obtained by the pre-trained model and a vector representation of the second-modal language material obtained by the pre-trained model; and may determine the similarity between the first-modal language material and the second-modal language material in the multi-modal language material obtained by the rewriting extension by: stitching the first-modal language material and the second-modal language material, and mapping a vector representation of the stitched language material obtained by the pre-trained model into a similarity value.

The training unit 402 is further configured to, when performing the single-modal learning task, predict a second part of content in the first-modal language material utilizing a vector representation of a first part of content in the first-modal language material and the vector representation of the second-modal language material in the multi-modal language material by the pre-trained model, with a training target of minimizing a difference between the predicted second part of content and the second part of content in the first-modal language material.

Specifically, the training unit 402 may update parameters of the pre-trained model using a constructed total loss function when performing the multi-task training operation. The total loss function is obtained by a sum of the loss function of at least one cross-modal contrastive learning task and the loss function of at least one single-modal learning task.

For the specific processing manner of each unit in the above-mentioned apparatus, reference may be made to the related description in the foregoing method embodiment, and the specific processing manner is not repeated herein.

According to the embodiment of the present disclosure, there are also provided an electronic device, a readable storage medium and a computer program product.

Figure 5:
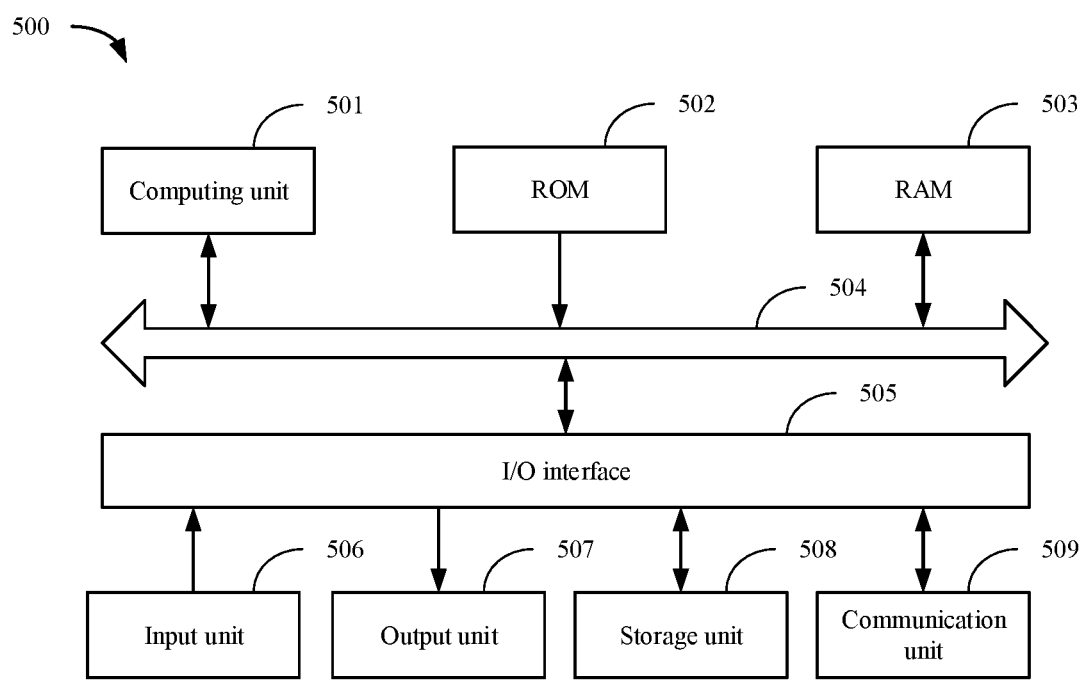
FIG. 5 is a block diagram of an electronic device configured to implement the embodiment of the present disclosure.

FIG. 5 is a block diagram of an electronic device configured to implement the embodiment of the present disclosure. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital processors, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 5, the device 500 includes a computing unit 501 which may perform various appropriate actions and processing operations according to a computer program stored in a read only memory (ROM) 502 or a computer program loaded from a storage unit 508 into a random access memory (RAM) 503. Various programs and data necessary for the operation of the device 500 may be also stored in the RAM 503. The computing unit 501, the ROM 502, and the RAM 503 are connected with one other through a bus 504. An input/output (I/O) interface 505 is also connected to the bus 504.

The plural components in the device 500 are connected to the I/O interface 505, and include: an input unit 506, such as a keyboard, a mouse, or the like; an output unit 507, such as various types of displays, speakers, or the like; the storage unit 508, such as a magnetic disk, an optical disk, or the like; and a communication unit 509, such as a network card, a modem, a wireless communication transceiver, or the like. The communication unit 509 allows the device 500 to exchange information/data with other devices through a computer network, such as the Internet, and/or various telecommunication networks.

The computing unit 501 may be a variety of general and/or special purpose processing components with processing and computing capabilities. Some examples of the computing unit 501 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 501 performs the methods and processing operations described above, such as the method for acquiring a pre-trained model. For example, in some embodiments, the method for acquiring a pre-trained model may be implemented as a computer software program tangibly contained in a machine readable medium, such as the storage unit 508.

In some embodiments, part or all of the computer program may be loaded and/or installed into the device 500 via the ROM 502 and/or the communication unit 509. When the computer program is loaded into the RAM 503 and executed by the computing unit 501, one or more steps of the method for acquiring a pre-trained model described above may be performed. Alternatively, in other embodiments, the computing unit 501 may be configured to perform the method for acquiring a pre-trained model by any other suitable means (for example, by means of firmware).

Various implementations of the systems and technologies described herein may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other.

It should be understood that various forms of the flows shown above may be used and reordered, and steps may be added or deleted. For example, the steps described in the present application may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A method for training a pre-trained model, comprising:
    acquiring training data, the training data comprising a single-modal language material comprising an image or a text and a multi-modal language material comprising an image-text pair which is semantically in pairs, and the multi-modal language material comprising a language material pair formed by a first-modal language material which is a text in a first language and a second-modal language material which is a text in a second language;
    performing at least one of rewriting extension and retrieval extension on the multi-modal language material in the training data, and adding the extended multi-modal language material into the training data;
    performing a multi-task training operation on a pre-trained model using the training data, the multi-task comprising at least one cross-modal contrastive learning task and at least one single-modal learning task;
    wherein the cross-modal contrastive learning task which is trained utilizing the multi-modal language material comprises: determining similarity between the first-modal language material and the second-modal language material in the multi-modal language material utilizing a vector representation of the first-modal language material and a vector representation of the second-modal language material in the multi-modal language material by the pre-trained model, with a training target of maximizing the similarity between the first-modal language material and the second-modal language material in a positive multi-modal language material and minimizing the similarity between the first-modal language material and the second-modal language material in a negative multi-modal language material; and the single-modal learning task which is trained utilizing the single-modal language material comprises: predicting a second part of content in the single-modal language material utilizing a vector representation of a first part of content in the single-modal language material by the pre-trained model, with a training target of minimizing a difference between the predicted second part of content and the second part of content in the single-modal language material, wherein in the cross-modal contrastive learning task, the similarity between the first-modal language material and the second-modal language material in the multi-modal language material obtained by the retrieval extension is determined by: calculating similarity between a vector representation of the first-modal language material obtained by the pre-trained model and a vector representation of the second-modal language material obtained by the pre-trained model; and the similarity between the first-modal language material and the second-modal language material in the multi-modal language material obtained by the rewriting extension is determined by: stitching the first-modal language material and the second-modal language material, and mapping a vector representation of the stitched language material obtained by the pre-trained model into a similarity value, wherein parameters of the pre-trained model are updated using a constructed total loss function when the multi-task training operation is performed;

the total loss function is obtained by an arithmetic sum of the loss function of the at least one cross-modal contrastive learning task and the loss function of the at least one single-modal learning task, wherein the loss function of the at least one cross-modal contrastive learning task is constructed according to: a similarity value calculated by stitching the image and the text, and mapping a vector representation of the stitched language material obtained by the pre-trained model; or a similarity calculated by calculating cosine similarity between a vector representation of the image obtained by the pre-trained model and a vector representation of the text obtained by the pre-trained model, and the loss function of the at least one single-modal learning task comprises the loss function of a visual learning task and the loss function of a text learning task, and adjusting finely the pre-trained model according to training data corresponding to a downstream task comprising a text classification task, an image classification task, a task of generating questions and answers for images, or a task of generating images for texts.

2. The method according to claim 1, wherein the rewriting extension comprises:

translating the text in the first language of the positive multi-modal language material into a text in the second language and then translating the text in the second language back to a text in the first language using a translation model, and constructing a new positive multi-modal language material by the text in the first language obtained after translation and the second-modal language material in the positive multi-modal language material; or parsing the first-modal language material in the positive multi-modal language material into a scenario graph, randomly replacing at least one of an entity, an attribute and a relationship in the scenario graph, converting the scenario graph obtained after replacement back into the first-modal language material, and constructing a new negative multi-modal language material by the first-modal language material obtained after conversion and the second-modal language material in the positive multi-modal language material.

3. The method according to claim 1, wherein the retrieval extension comprises:

retrieving the first-modal language material of the positive multi-modal language material in a first-modal corpus, and constructing a new positive multi-modal language material using the retrieved language material and the second-modal language material in the positive multi-modal language material.

4. An electronic device, comprising:

at least one processor; and a memory communicatively connected with the at least one processor;

wherein the memory stores instructions executable by the at least one processor, and the instructions are executed by the at least one processor to enable the at least one processor to perform a method for training a pre-trained model, wherein the method comprises:

acquiring training data, the training data comprising a single-modal language material comprising an image or a text and a multi-modal language material comprising an image-text pair which is semantically in pairs, and the multi-modal language material comprising a language material pair formed by a first-modal language material which is a text in a first language and a second-modal language material which is a text in a second language;

performing at least one of rewriting extension and retrieval extension on the multi-modal language material in the training data, and adding the extended multi-modal language material into the training data;

performing a multi-task training operation on a pre-trained model using the training data, the multi-task comprising at least one cross-modal contrastive learning task and at least one single-modal learning task;

wherein the cross-modal contrastive learning task which is trained utilizing the multi-modal language material comprises: determining similarity between the first-modal language material and the second-modal language material in the multi-modal language material utilizing a vector representation of the first-modal language material and a vector representation of the second-modal language material in the multi-modal language material by the pre-trained model, with a training target of maximizing the similarity between the first-modal language material and the second-modal language material in a positive multi-modal language material and minimizing the similarity between the first-modal language material and the second-modal language material in a negative multi-modal language material; and the single-modal learning task which is trained utilizing the single-modal language material comprises: predicting a second part of content in the single-modal language material utilizing a vector representation of a first part of content in the single-modal language material by the pre-trained model, with a training target of minimizing a difference between the predicted second part of content and the second part of content in the single-modal language material, wherein in the cross-modal contrastive learning task, the similarity between the first-modal language material and the second-modal language material in the multi-modal language material obtained by the retrieval extension is determined by: calculating similarity between a vector representation of the first-modal language material obtained by the pre-trained model and a vector representation of the second-modal language material obtained by the pre-trained model; and the similarity between the first-modal language material and the second-modal language material in the multi-modal language material obtained by the rewriting extension is determined by: stitching the first-modal language material and the second-modal language material, and mapping a vector representation of the stitched language material obtained by the pre-trained model into a similarity value, wherein parameters of the pre-trained model are updated using a constructed total loss function when the multi-task training operation is performed;

the total loss function is obtained by an arithmetic sum of the loss function of the at least one cross-modal contrastive learning task and the loss function of the at least one single-modal learning task, wherein the loss function of the at least one cross-modal contrastive learning task is constructed according to: a similarity value calculated by stitching the image and the text, and mapping a vector representation of the stitched language material obtained by the pre-trained model; or a similarity calculated by calculating cosine similarity between a vector representation of the image obtained by the pre-trained model and a vector representation of the text obtained by the pre-trained model, and the loss function of the at least one single-modal learning task comprises the loss function of a visual learning task and the loss function of a text learning task, and adjusting finely the pre-trained model according to training data corresponding to a downstream task comprising a text classification task, an image classification task, a task of generating questions and answers for images, or a task of generating images for texts.

5. The electronic device according to claim 4, wherein the rewriting extension comprises:

translating the text in the first language of the positive multi-modal language material into a text in the second language and then translate the text in the second language back to a text in the first language using a translation model, and constructing a new positive multi-modal language material by the text in the first language obtained after translation and the second-modal language material in the positive multi-modal language material; or parsing the first-modal language material in the positive multi-modal language material into a scenario graph, randomly replace at least one of an entity, an attribute and a relationship in the scenario graph, converting the scenario graph obtained after replacement back into the first-modal language material, and constructing a new negative multi-modal language material by the first-modal language material obtained after conversion and the second-modal language material in the positive multi-modal language material.

6. The electronic device according to claim 4, wherein the retrieval extension comprises:

retrieving the first-modal language material of the positive multi-modal language material in a first-modal corpus, and constructing a new positive multi-modal language material using the retrieved language material and the second-modal language material in the positive multi-modal language material.

7. A non-transitory computer readable storage medium with computer instructions stored thereon, wherein the computer instructions are used for causing a computer to perform a method for training a pre-trained model, wherein the method comprises:

acquiring training data, the training data comprising a single-modal language material comprising an image or a text and a multi-modal language material comprising an image-text pair which is semantically in pairs, and the multi-modal language material comprising a language material pair formed by a first-modal language material which is a text in a first language and a second-modal language material which is a text in a second language;

performing at least one of rewriting extension and retrieval extension on the multi-modal language material in the training data, and adding the extended multi-modal language material into the training data;

performing a multi-task training operation on a pre-trained model using the training data, the multi-task comprising at least one cross-modal contrastive learning task and at least one single-modal learning task;

wherein the cross-modal contrastive learning task which is trained utilizing the multi-modal language material comprises: determining similarity between the first-modal language material and the second-modal language material in the multi-modal language material utilizing a vector representation of the first-modal language material and a vector representation of the second-modal language material in the multi-modal language material by the pre-trained model, with a training target of maximizing the similarity between the first-modal language material and the second-modal language material in a positive multi-modal language material and minimizing the similarity between the first-modal language material and the second-modal language material in a negative multi-modal language material; and the single-modal learning task which is trained utilizing the single-modal language material comprises: predicting a second part of content in the single-modal language material utilizing a vector representation of a first part of content in the single-modal language material by the pre-trained model, with a training target of minimizing a difference between the predicted second part of content and the second part of content in the single-modal language material, wherein in the cross-modal contrastive learning task, the similarity between the first-modal language material and the second-modal language material in the multi-modal language material obtained by the retrieval extension is determined by: calculating similarity between a vector representation of the first-modal language material obtained by the pre-trained model and a vector representation of the second-modal language material obtained by the pre-trained model; and the similarity between the first-modal language material and the second-modal language material in the multi-modal language material obtained by the rewriting extension is determined by: stitching the first-modal language material and the second-modal language material, and mapping a vector representation of the stitched language material obtained by the pre-trained model into a similarity value, wherein parameters of the pre-trained model are updated using a constructed total loss function when the multi-task training operation is performed;

the total loss function is obtained by an arithmetic sum of the loss function of the at least one cross-modal contrastive learning task and the loss function of the at least one single-modal learning task, wherein the loss function of the at least one cross-modal contrastive learning task is constructed according to: a similarity value calculated by stitching the image and the text, and mapping a vector representation of the stitched language material obtained by the pre-trained model; or a similarity calculated by calculating cosine similarity between a vector representation of the image obtained by the pre-trained model and a vector representation of the text obtained by the pre-trained model, and the loss function of the at least one single-modal learning task comprises the loss function of a visual learning task and the loss function of a text learning task, and adjusting finely the pre-trained model according to training data corresponding to a downstream task comprising a text classification task, an image classification task, a task of generating questions and answers for images, or a task of generating images for texts.

* * * * *